United States Patent [19]

Martinez et al.

[11] Patent Number: 4,756,552
[45] Date of Patent: Jul. 12, 1988

[54] STEERING MECHANISM FOR VEHICLE WITH MULTIPLE STEERING WHEELS

[75] Inventors: Mario J. Martinez, Elgin, Ill.; Roy F. Engelbrecht, Ocala, Fla.

[73] Assignee: Elgin Sweeper Company, Elgin, Ill.

[21] Appl. No.: 94,267

[22] Filed: Sep. 8, 1987

[51] Int. Cl.⁴ .............................................. B62D 1/24
[52] U.S. Cl. ...................................... 280/774; 180/322
[58] Field of Search ................ 280/774; 180/321, 322, 180/323

[56] References Cited

U.S. PATENT DOCUMENTS

| 3,814,204 | 6/1974  | Larkin        | 180/322 |
| 4,548,291 | 10/1983 | Tamaka et al. | 180/321 |

FOREIGN PATENT DOCUMENTS

| 1232485 | 1/1967  | Fed. Rep. of Germany | 280/774 |
| 9567    | 12/1908 | France               | 280/774 |
| 204340  | 2/1924  | United Kingdom       | 180/322 |

Primary Examiner—Kenneth R. Rice
Attorney, Agent, or Firm—Charles F. Pigott, Jr.; Garrettson Ellis

[57] ABSTRACT

A vehicle having a steering system controlled by either of a pair of steering wheels also includes first and second steering wheel shafts means, each carrying one of the steering wheels. A wheel steering mechanism is mechanically connected to the first and second steering wheel shafts means. In accordance with this invention, a third shaft is attached at one end to the first steering wheel shafts means. The third shaft means is connected at its other end without intermediate, intervening gears to a gear for rotationally interconnecting the third shaft, the second steering wheel shaft, and the wheel steering mechanism. This structure can eliminate an expensive 90 degree gear box when compared with prior art designs, for significant cost savings while providing equivalent or superior function.

4 Claims, 3 Drawing Sheets

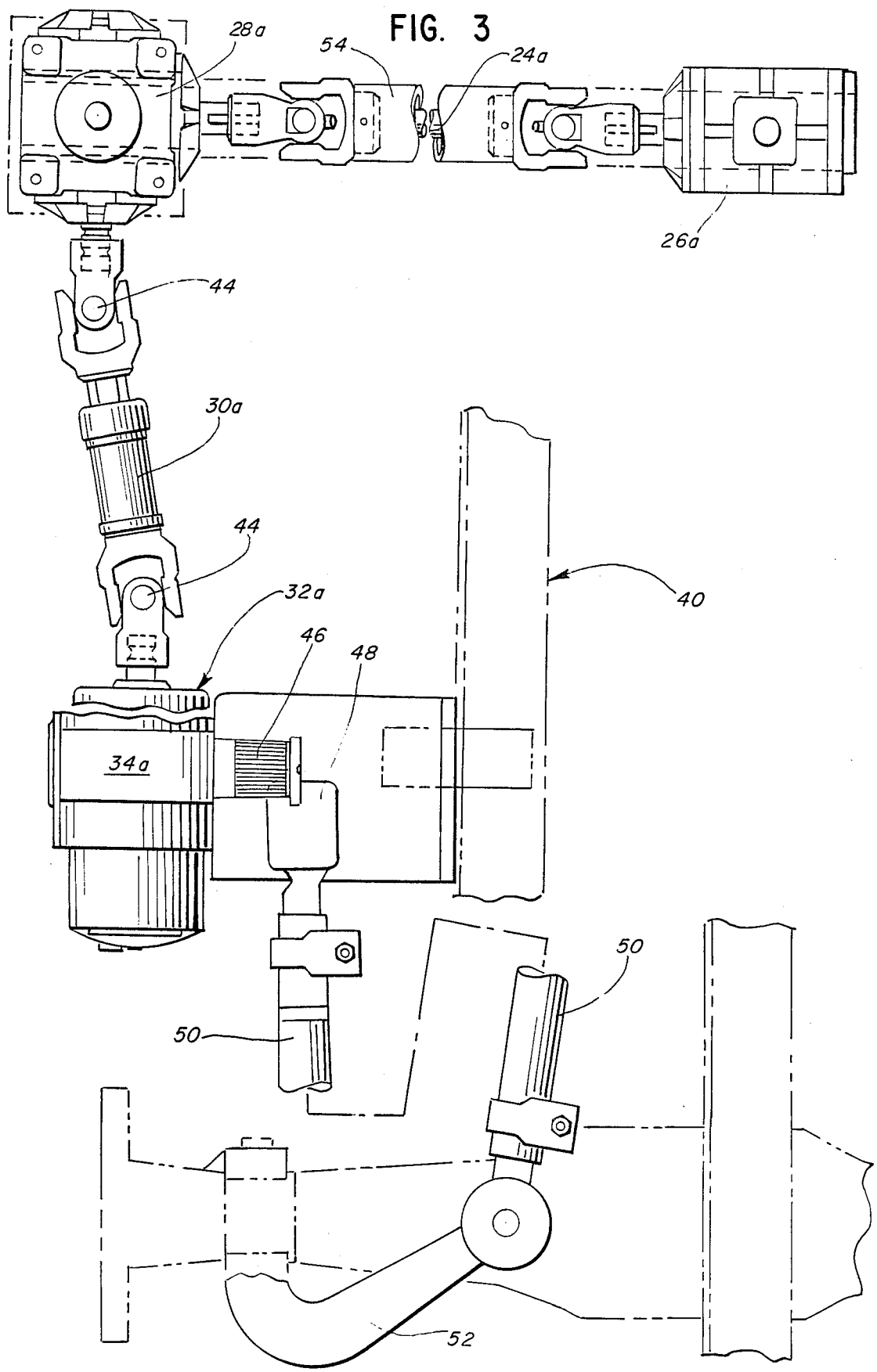

STEERING MECHANISM FOR VEHICLE WITH MULTIPLE STEERING WHEELS

BACKGROUND OF THE INVENTION

Certain vehicles, for example street sweeping machines, may have a pair of steering wheels, typically placed in side-by-side relation so that the opertor can sit on either side of the cab for close observation of the desired side of the vehicle as the sweeping operations proceed. Both steering wheels are mechanically linked to the wheel steering mechanism of the vehicle, so that as one steering wheel is rotated by the operator, the other steering wheel rotates with it as the road wheels are turned.

To accomplish this, a typical prior art construciton provides connection of the shaft which carries each steering wheel to a 90-degree gear box. Each of these 90-degree gear boxes are, in turn, connected by shafts to a T-box in which three shafts are rotationally interconnected, two of the shafts connecting to the 90-degree gear boxes, and a third shaft communicating with the wheel steering mechanism.

In accordance with this invention, the above prior art design is improved by a steering system that exhibits essentially the same function as that of the prior art, but which effectively permits the elimination of one of the 90-degree gear boxes. This can result in a significant reduction in the overall cost of the system, without any loss of utility or effectiveness thereof.

DESCRIPTION OF THE INVENTION

In this invention, a vehicle is provided having a steering system controlled by either of a pair of steering wheels, a nd including first and second steering wheel shaft means, each carrying one of the steering wheels. The vehicle also has a wheel steering mechanism which is mechanically connected to the first and second steering wheel shaft means.

In accordance with this invention, third shaft means are rotationally attached at one end to the first steering wheel shaft means, the third shaft means being connected at its other end, without the presence of intermediate, intervening gears, to gear means for rotationally interconnecting the third shaft means, the second steering wheel shaft means, and the wheel steering mechanism. By this use and positioning of such gear means for rotationally interconnecting the three parts as described above, it becomes possible to eliminate of one of the 90-degree gear boxes found in the analagous sytem of the prior art.

Preferably, the third shaft means, the second steering wheel shaft means, and the wheel steering mechanism all connect to the rotationally interconnecting gear means at substantially mutually perpendicular angles. Additionally, the mechanical connection between the first and second steering wheel shaft means preferably contains no more than one angled gear connection (such as a 90-degree gear box) apart from the rotationally interconnecting gear means.

Also, the wheel steering mechanism typically includes a main steering gear, plus shaft means which is free of intermediate gears, connecting the main steering gear and the rotationally interconnecting gear means.

Thus, by this invention an improved steering system is provided having greater efficiency at lower cost.

DESCRIPTION OF DRAWINGS

In the drawings,

FIG. 3 is an enlarged, detailed, fragmentary plan view of the steering system of FIG. 2.

DESCRIPTION OF SPECIFIC EMBODIMENTS

Figure 2:
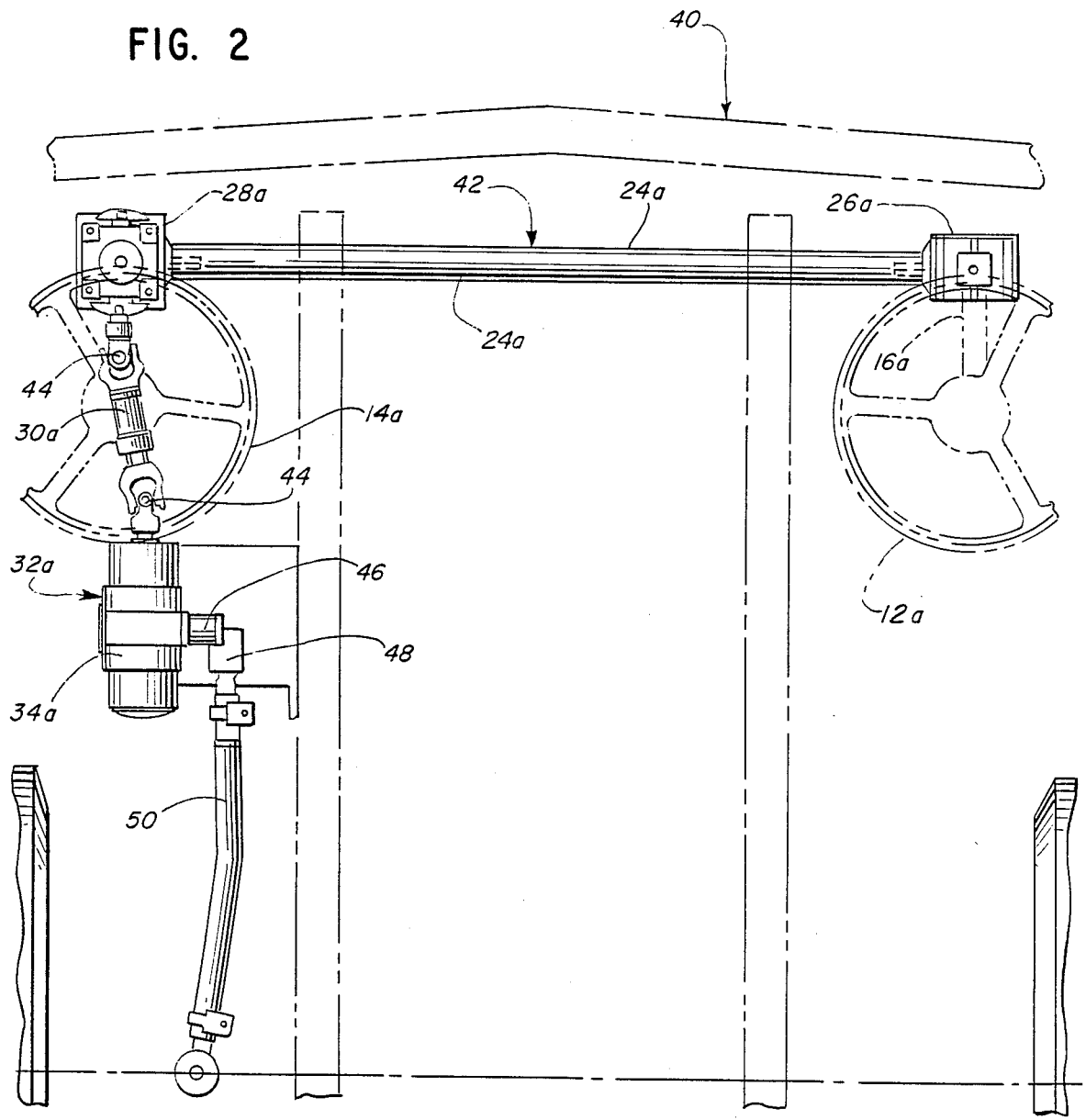
FIG. 2 is a fragmentary plan view of another embodiment of steering system in accordance with this invention.

Referring to the drawings, they disclose a steering system for a vehicle which may be of entirely conventional design except as otherwise indicated herein. Thus, many details of the vehicle are not shown in any detail.

In vehicles such as street sweepers, but also road graders and other large vehicles, a pair of steering wheels may be present so that the operator may sit on either the left or right side of the vehicle, depending on the area he needs to view. Additionally, in some circumstances two operators may be present with one giving instruction to the other, with each operator having a steering wheel.

Figure 1:
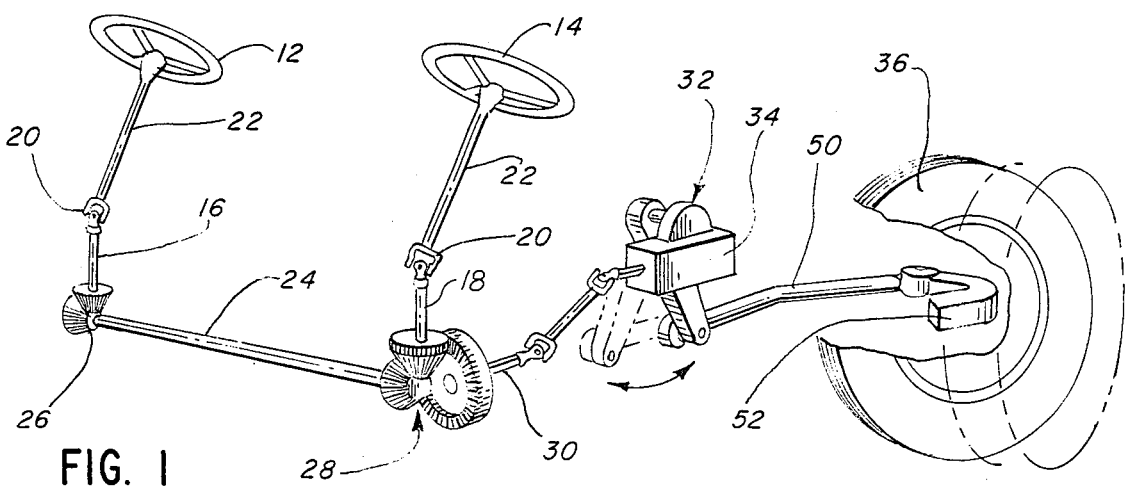
FIG. 1 is a fragmentary perspective view of a vehicle, showing a steering system in accordance with this invention.

FIG. 1 shows a simplified embodiment of the steering system of this invention. Steering wheels 12, 14, are respectively connected to first steering wheel shaft means 16 and second steering wheel shaft means 18. As shown, angled joints 20 permit the desired angled placement of steering columns 22, as is conventional. A third shaft 24 is provided, which carries at one end an angled gear connection 26 such as a conventional 90-degree gear box, for rotational connection of first steering wheel shaft 16 with third shaft 24. At the other end of third shaft 24, there is shown simplified gear means 28 for rotationally interconnecting three shafts; namely, third shaft 24, second steering wheel shaft 18, and a shaft 30 that is part of wheel steering mechanism 32. Wheel steering mechanism 32 may be of conventional design, including main steering gear 34 and other known, appropriate parts for the steering of wheels 36.

One advantage of the embodiment of this invention is that, when compared with the prior art discussed above, one can eliminate one of the 90-degree gear boxes used in the prior art for a considerble cost saving. The "T" gear box of the prior art, which involves a three-way gear connection, may be replaced with the gear connection 28 which is also a T-connection except that the shafts 18, 24, 30 that connect in such gear connection are, in this embodiment, at substantially mutually perpendicular angles, as shown in FIG. 1.

Figure 4:
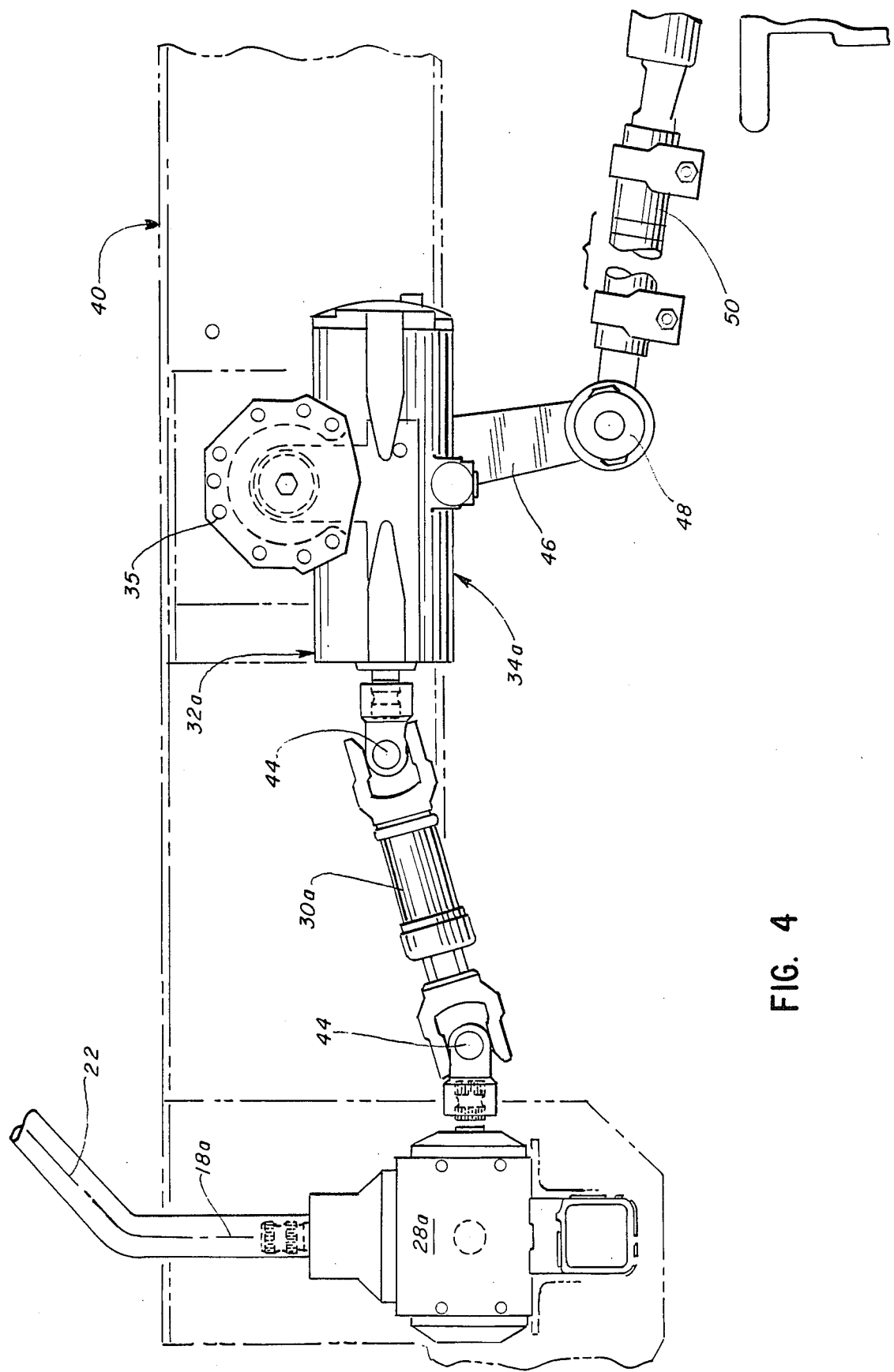
FIG. 4 is a fragmentary elevational view of the system of FIG. 3.

Turning now to FIGS. 2 through 4, vehicle 40 is simply represented by a wall, symbolizing the frame in which steering system 42 can be carried. Vehicle 40 may be of any desired design, being generally conventional except for the differences described herein.

As in the embodiment of FIG. 1, steering wheels 12a, 14a connect to their respective steering wheel shafts 16a, 18a. Steering wheel shaft 16a connects to a conventional 90-degree gear box 26a which, in turn, connects to third shaft 24a at one end thereof. Third shaft 24a connects at its other end to three-way gear means 28a for rotationally interconnecting third shaft 24a with second steering wheel shaft 18a and the shaft 30a which connects with wheel steering mechanism 32a. It can be seen that shaft 30a contains a conventional pair of pivots 44, so that three-way gear member 28a and main steering gear 34a may be positioned out of line. Specifically, suitable three-way gear members to perform the function of members 28 or 28a are commercially available from the Curtis Machine Company of Dodge City, Kan. as a type M, Special Model 217 three-shaft gear box.

The wheel steering mechanism 32a beginning with shaft 30a used in this invention may be of conventional design. Steering gear 34a is actuated by shaft 30a to move output shaft 46, which shaft carries Pitman arm 48. Pitman arm 48 is, in turn, connected to drag link 50, which operates steering arch 52 in conventional manner for steering of the wheels.

FIG. 3 shows conventional structure of third shaft 24a, showing the outer housing structure 54, also of conventional design.

Main steering gear 34a may be bolted by bolts 35 to the frame of vehicle 40.

Steering arch 52 connects in conventional manner to a tie-rod arm and a tie-rod, carried on the front axle, for effecting steering of the wheels in conventional manner.

The above has been offered for illustrative purposes only, and is not intended to limit the scope of the invention of this application, which is as defined in the claims below.

That which is claimed is:

1. In a vehicle having a steering system controlled by either of a pair of steering wheels and including first and second steering wheel shaft means, each carrying one of said steering wheels, and a wheel steering mechanism mechanically connected to said first and second steering wheel shaft means, the improvement comprising, in combination:

third shaft means rotationally connected at one end to said first steering wheel shaft means, said third shaft means being rotationally connected at its other end without intermediate, intervening gears to gear means rotationally interconnecting at substantially mutually perpendicular angles said third shaft means, said second steering wheel shaft means, and said wheel steering mechanism.

2. The vehicle of claim 1 in which said wheel steering mechanism includes a main steering gear and shaft means, free of intermediate gears, connecting said main steering gear and the rotationally interconnecting gear means.

3. In a vehicle having a steering system controlled by either of a pair of steering wheels and including first and second steering wheel shaft means, each carrying one of such steering wheels, and a wheel steering mechanism mechanically connected to said first and second steering wheel shaft means, the improvement comprising, in combination;

third shaft means rotationally connected at one end to said first steerng wheel shaft means, said third shaft means being rotationally connected at its other end without intermediate intervening gears to gear means for rotationally interconnecting said third shaft means, said second steering wheel shaft means, and said wheel steering mechanism, in which said third shaft means, said second steering wheel shaft means, and said wheel steering mechanism all connect to said rotationally interconnecting gear means at substantially mutually perpendicular angles, the mechanical connection between said first and second steering wheel shaft means containing no more than one angled gear connection, apart from said rotationally interconnecting gear means.

4. The vehicle of claim 3 in which said wheel steering mechanism includes a main steering gear, and shaft means, free of intermediate gears, connecting said main steering gear and the rotationally interconnecting gear means.

* * * * *